United States Patent [19]

Cohen

[11] 4,386,027
[45] May 31, 1983

[54] FLAME-RETARDED THERMOPLASTIC POLYESTER COMPOSITIONS HAVING IMPROVED ARC RESISTANCE AND PROCESS FOR PREPARING SAME

[75] Inventor: Stuart C. Cohen, Evansville, Ind.

[73] Assignee: General Electric Company, Pittsfield, Mass.

[21] Appl. No.: 866,009

[22] Filed: Dec. 30, 1977

[51] Int. Cl.$^2$ .......................... C08K 3/34; C08K 9/06
[52] U.S. Cl. .................................. 523/210; 525/439; 523/212; 523/213; 524/449
[58] Field of Search ............................. 260/40 R, 860

[56] References Cited

U.S. PATENT DOCUMENTS

| | | | |
|---|---|---|---|
| 3,290,165 | 12/1966 | Iannicelli | 260/40 R |
| 3,824,209 | 7/1974 | Anderson | 260/45.9 R |
| 3,855,277 | 12/1974 | Fox | 260/860 |
| 3,953,394 | 4/1976 | Fox et al. | 260/40 R |
| 4,064,098 | 12/1977 | Saitoh et al. | 260/40 R |
| 4,122,061 | 10/1978 | Halub et al. | 260/40 R |

OTHER PUBLICATIONS

"Low-Cost Suzorite Mica Flake Prevents Distortion in PBT," news release from Marietta Resources, 8/76.

Primary Examiner—Sandra M. Person
Attorney, Agent, or Firm—Morgan, Finnegan, Pine Foley & Lee

[57] ABSTRACT

Flame-retarded, reinforced and unreinforced thermoplastic compositions having improved arc resistance are provided comprising a high molecular weight linear polyester, such as poly(1,4-butylene terephthalate) and the like, a flame-retarding amount of a flame-retardant, such as an aromatic polycarbonate and a particulate material selected from the group consisting of finely divided mica and finely divided clay. A process for improving the arc resistance of reinforced or unreinforced flame retardant polyester compositions is also provided, the process comprising admixing finely divided mica or finely divided surface treated clay with a high molecular weight linear polyester and a flame-retardant.

13 Claims, No Drawings

FLAME-RETARDED THERMOPLASTIC POLYESTER COMPOSITIONS HAVING IMPROVED ARC RESISTANCE AND PROCESS FOR PREPARING SAME

BACKGROUND OF THE INVENTION

This invention relates to flame-retardant thermoplastic compositions having improved dielectric properties and a process for the preparation thereof. More particularly, it pertains to compositions comprising a high molecular weight linear polyester, a flame-retardant, a particulate material such as mica or clay, and, optionally, a reinforcing agent and a process for improving the arc track resistance of reinforced, flame-retardant linear high molecular weight polyester compositions without impairing the flame-retardancy and other desirable properties such as strength, modulus and heat deflection temperature.

High molecular weight linear polyesters and copolymers of glycols and terephthalic or isophthalic acid have been available for a number of years. These are described inter alia in Whinfield et al., U.S. Pat. No. 2,465,319 and in Pengilly, U.S. Pat. No. 3,047,539. These patents disclose that the polyesters are particularly advantageous as film and fiber-formers.

With the development of molecular weight control, use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

One useful family of such compositions comprises those which are reinforced, e.g., with from about 10 to about 40% of filamentous glass, based on the weight of glass and polyester components, and rendered flame-retardant by the incorporation of a flame-retarding amount of a flame-retarding component.

Another useful family of such compositions comprises those containing poly(1,4-butylene terephthalate), a polycarbonate resin, a flame-retardant and, optionally, a reinforcing agent.

Experience has shown, however, that articles molded from these afore-described compositions are characterized with poor electrical arc resistance properties.

It has now been surprisingly discovered that the incorporation of a particulate material such as finely divided mica or finely divided surface treated clay improves the high voltage arc track resistance or reinforced or unreinforced flame-retarded polyester resins while not adversely affecting the flame-retardancy and the other excellent physical properties of the composition.

DETAILED DESCRIPTION OF THE INVENTION

According to this invention, there are provided thermoplastic compositions with improved arc track resistance useful for molding, e.g., injection molding, compression molding, and the like, comprising:
(a) a high molecular weight linear polyester resin,
(b) a flame-retarding amount of a flame retardant;
(c) a particulate material selected from the group consisting of finely divided mica and finely divided surface-treated clay; and
(d) optionally, a reinforcing agent.

In a further embodiment of the present invention a process is provided for increasing the arc track resistance of reinforced flame-retarded thermoplastic compositions, said process comprising admixing finely divided mica or finely divided surface-treated clay with a high molecular weight linear polyester resin, a flame-retardant and, optionally, a reinforcing agent.

The high molecular weight normally flammable linear polyesters used in the practice of the present invention are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. No. 2,465,319 and U.S. Pat. No. 3,047,539, and elsewhere.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula

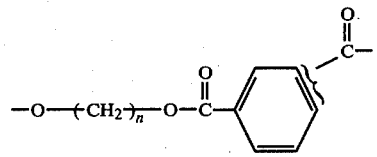

wherein n is a whole number of from two to four, and mixtures of such esters, including copolyesters of terephthalic and isophthalic acids of up to about 30 mole percent isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram and preferably, at least 0.7 deciliters/gram as measured in a 60:40 phenol/tetrachloroethane mixture at 30° C. At intrinsic viscosities of at least about 1.1 deciliters. gram, there is a further enhancement in toughness of the present compositions.

A preferred polyester composition within the scope of the present invention comprises reinforced or unreinforced poly(1,4-butylene terephthalate) and a polycarbonate resin. It has been found that molded articles made from poly(1,4-butylene terephthalate) can be made substantially resistant to warpage or distortion, among other processing advantages, if a polycarbonate resin is added to the polyester molding composition.

Thus, polycarbonate resins useful in the practice of this invention, have recurring units of the formula:

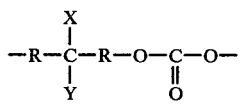

wherein each —R— is selected from the group consisting of phenylene, halo-substituted phenylene and alkyl-substituted phenylene, and X and Y are each selected from the group consisting of hydrogen, hydrocarbon radicals free from aliphatic unsaturation and of radicals which, together with the adjoining

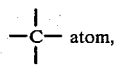

form a cycloalkene radical, the total number of carbon atoms in X and Y being up to 12.

The preferred polycarbonate resins may be derived from the reaction of bisphenol-A and phosgene. These polycarbonates have from 20–400 recurring units of the formula:

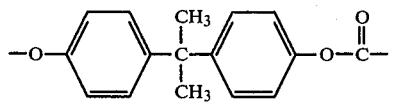

The polycarbonates are described in U.S. Pat. Nos. 3,028,365, 3,334,154 and 3,915,926, all of which are incorporated herein by reference. The polycarbonate should have an intrinsic viscosity between 0.3 and 1.0, preferably from 0.3 to 0.50 as measured at 20° C. in methylene chloride.

The amount of flame-retardant additive used is not critical to the invention, so long as it is present in a minor proportion based on said composition—major proportions will detract from physical properties—but at least sufficient to reduce the flammability of the polyester resin. Those skilled in the art are well aware that the amount will vary with the nature of the resin and with the efficiency of the additive. In general, however, the amount of additive will be from 0.5 to 50 parts by weight per 100 parts of resin. A preferred range will be from about 3 to 50 parts and an especially preferred range will be from about 8 to 45 parts of additive per 100 parts of resin. Synergists, e.g., antimony oxide, will be used at about 2 to 10 parts by weight per 100 parts of resin.

Any of the conventional flame-retardants, such as decabromodiphenyl ether can be employed in the composition of the present invention. Preferred flame-retardants are aromatic carbonate homopolymers having repeating units of the formula:

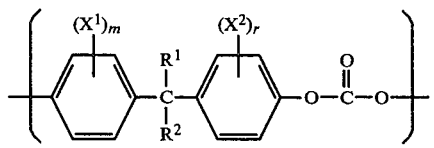

wherein $R^1$ and $R^2$ are hydrogen, (lower) alkyl or phenyl, $X^1$ and $X^2$ are bromo or chloro or mixtures thereof and m and r are from 1 to 4. These materials may be prepared by techniques well known to those skilled in the art. Also preferred are aromatic carbonate copolymers in which from 25 to 75 weight percent of the repeating units comprise chloro- or bromosubstituted dihydric phenol, glycol or dicarboxylic acid units. See, e.g., A. D. Wambach, U.S. Pat. No. 3,915,926, above-mentioned. A particularly preferred flame retardant herein is an aromatic (copoly-) carbonate of 50:50 mole ratio of bisphenol A and tetrabromobisphenol A prepared like Procedure A of U.S. Pat. No. 3,915,926.

Moreover, the flame retardants used herein, such as the aromatic polycarbonate flame retardants, can also be used with a synergist, particularly inorganic or organic antimony compounds. Such compounds are widely available or can be made in known ways. In preferred embodiments, the type of antimony compound used is not critical, being a choice primarily based on economics. For example, as inorganic compounds there can be used antimony oxide ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids and the like. Illustrative of the organic antimony compounds, including inorganic salts of such compounds, are: KSb tartrate; Sb caproate; $Sb(OCH_2CH_3)_3$; $Sb(OCH(CH_3)CH_2CH_3)_3$; Sb polymethylene glycolate; triphenyl antimony; and the like; Especially preferred is antimony oxide.

The mica used in the practice of the present invention to improve the arc resistance of the polyester compositions is finely divided and in general can have a particle size range of from about 1 to 100 microns. Typical micas employed herein are known as C-1000, available from The English Mica Company, and 325 mesh waterground mica, available from The English Mica Company.

Similarly, the clay used herein is finely divided, having particle sizes of from 1 to 50 microns.

Moreover, the finely divided clay contemplated by the present invention has been surface-treated with a silane material such as an aminosilane like gamma-aminopropyltriethoxysilane, a short chain ($C_1$–$C_2$) vinyl silane like vinyl-tris($\beta$-methoxyethoxyl)silane, long chain ($C_{18}$) vinyl silanes and the like.

The improved flame-retarded compositions of the present invention may also, optionally, contain a reinforcing agent. Although it is only necessary to have at least a reinforcing amount of the reinforcement present, in general the reinforced compositions will comprise from 10 to 80% by weight of the total composition of the reinforcing agent.

The reinforcing agents employed herein are well known but illustratively, they may be selected from the group consisting of metals, such as aluminum, iron or nickel particles and the like, and non-metals, such as carbon filaments, silicates, such as acicular calcium silicate, asbestos, titanium oxide, potassium titanate and titanate whiskers, wollastonite glass flakes and fibers.

In particular, preferred reinforcing agents and fillers are of glass, and it is usually preferred to employ fibrous glass filaments comprised of lime-aluminum borosilicate glass that is relatively soda-free. This is known as "E" glass. However, other glasses are useful where electrical properties are not important, e.g., the low soda glass known as "C" glass. The filaments are made by standard processes, e.g., by steam or air blowing, flame blowing and mechanical pulling. The filament diameters range from about 0.00012 to 0.00075 inch, but this is not critical to the present invention. Glass fibers may be surface coated in accordance with standard procedures to improve their reinforcing performances. In general, best properties will be obtained from reinforced compositions that contain from about 15 to about 30 percent by weight of the glass reinforced composition.

The length of glass filaments and whether or not they are bundled into fibers and the fibers bundled, in turn, to yarns, ropes or rovings, or woven into mats, and the like, are also not critical to the practice of the invention. In preparing the present compositions, it is convenient to use the filamentous glass in the form of chopped strands of from about ⅛ inch to about 1 inch long, preferably less than ¼ inch long. In articles that are molded from the compositions of the invention, even shorter lengths will be encountered because, during compounding, considerable fragmentation will occur. This is desirable, however, because the best properties are exhibited by thermoplastic injection molded articles in which the filament lengths lie between about 0.000005 inch and 0.12 (⅛ inch).

The process herein by which the finely divided mica or finely divided clay is incorporated into the flame-retarded polyester composition to improve the arc resistance of the same can vary among a wide variety of procedures. For example, in one way, the mica or clay, the reinforcing agent, if used, and the flame-retardant are all put into an extrusion compounder with the polyester resin to produce molding pellets. The mica or clay, the reinforcing agent, if used, and flame retardant are dispersed in a matrix of the polyester resin in the process. In another procedure, the mica or clay, reinforcing agent, if used, and flame-retardant are mixed with the polyester resin by dry blending, then either fluxed on a mill and comminuted, or they are extruded and chopped. The mica or clay, reinforcing agent, if used, and flame retardant can also be mixed with the powdered or granular polyester and directly molded, e.g., by injection or transfer molding techniques.

It is always important to thoroughly free the polyester resin and flame-retardant from as much water as possible.

In addition, compounding should be carried out to ensure that the residence time in the machine is short; the temperature is carefully controlled; the friction heat is utilized; and an intimate blend between the mica or clay, the resin, and the flame-retardant is obtained.

Although it is not essential, best results are obtained if the ingredients are pre-compounded, pelletized and then molded. Pre-compounding can be carried out in conventional equipment. For example, after carefully pre-drying the polyester resin and flame retardant, e.g., under vacuum at 125° C. for 4 hours, a single screw extruder is fed with a dry blend of the polyester resin, flame-retardant, mica or clay and reinforcing agent, if used, the screw employed having a long transition metering section to ensure proper melting. On the other hand, a twin screw extrusion machine, e.g., a 28 mm Werner Pfleiderer machine can be fed with resin and additives (e.g., mica or clay and flame-retardant) at the feed port and reinforcement downstream. In either case, a generally suitable machine temperature will be about 450° to 570° F.

The pre-compounded composition can be extruded and cut up into molding compounds such as conventional granules, pellets, etc., by standard techniques.

The compositions of this invention can be molded in any equipment conventionally used for glass-filled thermoplastic compositions. For example, with poly(1,4-butylene terephthalate), good results will be obtained in an injection molding machine, e.g., of the Newbury type with conventional cylinder temperature, e.g., 450° F. and conventional mold temperatures, e.g., 150° F. On the other hand, with poly(ethylene terephthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperature of at least 230° F. will be used.

In order that those skilled in the art may better understand how to practice the present invention, the following examples are given by way of illustration and not by way of limitation.

EXAMPLE 1

A dry blend of 31.8 percent by weight VALOX 300 (poly 1,4-butylene terephthalate, 0.9 intrinsic viscosity, General Electric Co.), 13% by weight LEXAN RL-1624, aromatic (copoly-) carbonate of 50:50 mole ratio of bisphenol-A and tetrabromobisphenol A, 5% by weight antimony oxide, 30% by weight fibrous glass reinforcement, 20% by weight mica (C-1000 sold by English Mica Co.), 0.15% by weight Irganox 1093 (Ciba-Geigy tetrakis (3,5-di-t-butyl-4-hydroxy phenyl) propionyl oxymethyl methane) and 0.05% Ferro 904 (diphenyldecylphosphite) is compounded and extruded. The extrudate is pelletized and injection molded. Six molded samples are tested for electrical arc resistance, as measured by the ASTM D-495 test procedure, and exhibit an arc resistance of 104 seconds.

In addition, the formulation of this example exhibits good mechanical properties, as follows:

| Properties | |
|---|---|
| Notched Izod Impact ft. lbs./in. | 1.0 |
| unnotched Izod ft. lbs./in. | 6.2 |
| Tensile strength, psi | 16,100 |
| flame-retardancy | V-O |

For comparison purposes, a formulation the same as described above, except that the 20% mica is replaced with 20% VALOX 300, is tested for arc resistance (ASTM-D-495). The sample shows an arc resistance of only 17 seconds.

EXAMPLE 2

A dry blend of 31.8% VALOX 300, 13% by weight LEXAN RL-1624, 5% by weight antimony oxide, 30% by weight fibrous glass reinforcement, 20% by weight clay (EX-45, aminosilane treated, sold by the Freeport Kaolin Co.), 0.15% by weight Irganox 1093 and 0.05% by weight Ferro 904 is compounded and extruded. The extrudate is pelletized and injection molded. The sample is tested for arc resistance according to ASTM-D-495 and gives an arc resistance of about 80 seconds. In addition, the sample is V-O (UL Standard 94 test) and has a notched Izod of 0.8–0.9 ft. lbs./in. A similar sample but not containing the clay exhibits an inferior arc resistance of only 15 seconds.

Similar compositions as in Example 2 are formulated using clay OX-2 (sold by the Freeport Kaolin Co., treated with a long chain ((C$_{18}$) vinyl silane) and clay Translink 37 (sold by Freeport Kaolin Co., treated with short chain (C$_1$-C$_2$) vinyl silane) in lieu of clay EX-45). The samples are tested for arc resistance according to ASTM-D-495 test procedures and exhibit an arc resistance of about 105 seconds and 100 seconds, respectively.

It is to be understood that changes may be made in the particular embodiments of the invention described which are within the full intended scope of the invention as defined by the appended claims.

I claim:

1. A process for improving the electrical arc resistance of a thermoplastic composition, said process comprising admixing a particulate material selected from the group consisting of mica and surface treated clay with a high molecular weight linear polyester resin and a flame-retarding amount of a flame-retardant, thereby increasing the arc resistance of the composition.

2. A process as defined in claim 1 wherein a polycarbonate resin is also admixed in the composition.

3. A process as defined in claim 1 wherein the particulate material is mica.

4. A process as defined in claim 1 wherein the particulate material is surface treated clay.

5. A process as defined in claim 1 wherein the particulate material is employed in an amount of from about 5 to about 50 percent by weight of the total composition.

6. A process as defined in claim 1 wherein the said polyester has an intrinsic viscosity of at least about 0.4 deciliters per gram when measured in a solution in a 60:40 mixture of phenol and trichloroethane at 30° C.

7. A process as defined in claim 1 wherein said flame-retardant is selected from the group consisting of an aromatic carbonate homopolymer having repeating units of the formula:

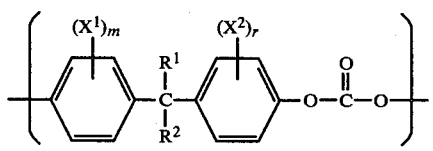

wherein R$^1$ and R$^2$ are hydrogen, lower alkyl or phenyl, X$^1$ and X$^2$ are bromo or chloro or mixtures thereof and m and r are from 1 to 4, an aromatic (copoly-) carbonate in which from 25 to 75 wt. percent of the repeating units comprise chloro or bromo-substituted dihydric phenol units and the remainder of the repeating units comprise dihydric phenol, glycol or dicarboxylic acid units, and mixtures thereof.

8. A process as defined in claim 2 wherein said polycarbonate consists essentially of recurring units of the formula:

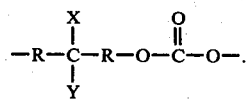

wherein each —R— is selected from the group consisting of phenylene, halo-substituted phenylene and alkyl substituted phenylene, and X and Y are each selected from the group consisting of hydrogen, hydrocarbon radicals free from alipathic unsaturation and of radicals which, together and with the adjoining

atom, form a cycloalkane radical, the total number of carbon atoms in X and Y being up to 12.

9. A process as defined in claim 1 wherein said flame-retardant is an aromatic (copoly-) carbonate of a 50:50 mole ratio of bisphenol and tetrabromobisphenol A.

10. A process as defined in claim 1 wherein said polyester is poly(1,4-butylene terephthalate).

11. A process as defined in claim 8 wherein said polycarbonate has the repeating units

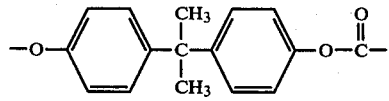

12. A process as defined in claim 11 wherein the polycarbonate resin consists of from 20 to 400 repeating units.

13. A process as defined in claim 11 wherein said reinforcing agent is glass fibers.

* * * * *